US012608177B2

(12) United States Patent
Pilcicki et al.

(10) Patent No.: US 12,608,177 B2
(45) Date of Patent: Apr. 21, 2026

(54) AUTOMATED GENERATION OF JAVA MANAGEMENT EXTENSIONS (JMX) CONNECTOR WITHIN INTEGRATION PLATFORM

(71) Applicant: Boomi, LP, Conshohocken, PA (US)

(72) Inventors: Matthew J. Pilcicki, Royersford, PA (US); Richard Moon, Jersey City, NJ (US); Michael Bachman, Bala Cynwyd, PA (US)

(73) Assignee: Boomi, LP, Conshohocken, PA (US)

( * ) Notice: Subject to any disclaimer, the term of this patent is extended or adjusted under 35 U.S.C. 154(b) by 228 days.

(21) Appl. No.: 18/421,619

(22) Filed: Jan. 24, 2024

(65) Prior Publication Data

US 2025/0238207 A1      Jul. 24, 2025

(51) Int. Cl.
  *G06F 8/30*          (2018.01)
  *G06F 8/38*          (2018.01)

(52) U.S. Cl.
  CPC ............... *G06F 8/315* (2013.01); *G06F 8/38* (2013.01)

(58) Field of Classification Search
  CPC ................ G06F 8/24; G06F 8/34; G06F 8/38
  See application file for complete search history.

(56) References Cited

U.S. PATENT DOCUMENTS

| | | | | |
|---|---|---|---|---|
| 9,037,695 | B2 * | 5/2015 | Derksen ................. | H04L 41/00 |
| | | | | 717/101 |
| 2003/0177477 | A1 * | 9/2003 | Fuchs ................. | H04L 41/0233 |
| | | | | 717/136 |
| 2009/0320045 | A1 * | 12/2009 | Griffith .................. | H04L 67/34 |
| | | | | 719/315 |
| 2010/0262956 | A1 * | 10/2010 | Okada ...................... | G06F 8/24 |
| | | | | 717/166 |

OTHER PUBLICATIONS

"Java VisualVM," https://docs.oracle.com/javase/8/docs/technotes/guides/visualvm/, retrieved Jan. 16, 2024, 2 pages.

(Continued)

*Primary Examiner* — Duy Khuong T Nguyen
(74) *Attorney, Agent, or Firm* — Procopio, Cory, Hargreaves & Savitch LLP

(57) ABSTRACT

Currently, technical expertise is required to construct a connector between an integration process and a Java Management extensions (JMX) server. Disclosed embodiments enable automated configuration of a JMX connector, which can be integrated into one or more integration processes. The configuration process may comprise iterating over descriptors of attributes or operations to automatically generate a data schema that can be incorporated into a profile of the JMX connector. The data schema is then used, during execution of the JMX connector, to retrieve attributes of a resource being monitored by the probe layer of JMX or execute an operation available via the application programming interface of the JMX server. The JMX connector enables JMX data to be integrated in the same manner as conventional integration data, and enhances security by enabling JMX data to be confined within the boundaries of the integration platform.

12 Claims, 3 Drawing Sheets

(56)     References Cited

OTHER PUBLICATIONS

"BlazeMeter JMX Converter" by Perforce, https://converter.blazemeter. com/, retrieved Jan. 23, 2024, 1 page.

"JMX Monitoring Integration", New Relic Documentation, https:// docs.newrelic.com/docs/infrastructure/host-integrations/host-integrations-list/jmx-monitoring-install/, retrieved Jan. 16, 2024, 10 pages.

"JMX", Datadog, https://docs.datadoghq.com/integrations/java/? tab=host, retrieved Jan. 16, 2024, 13 pages.

"JMX Monitoring and Integration with Zabbix", https://www.zabbix. com/integrations/jmx, retrieved Jan. 16, 2024, 7 pages.

"JMX to JSON in Real-Time", https://www.striim.com/integrations/ jmx-json/, retrieved Jan. 16, 2024, 2 pages.

* cited by examiner

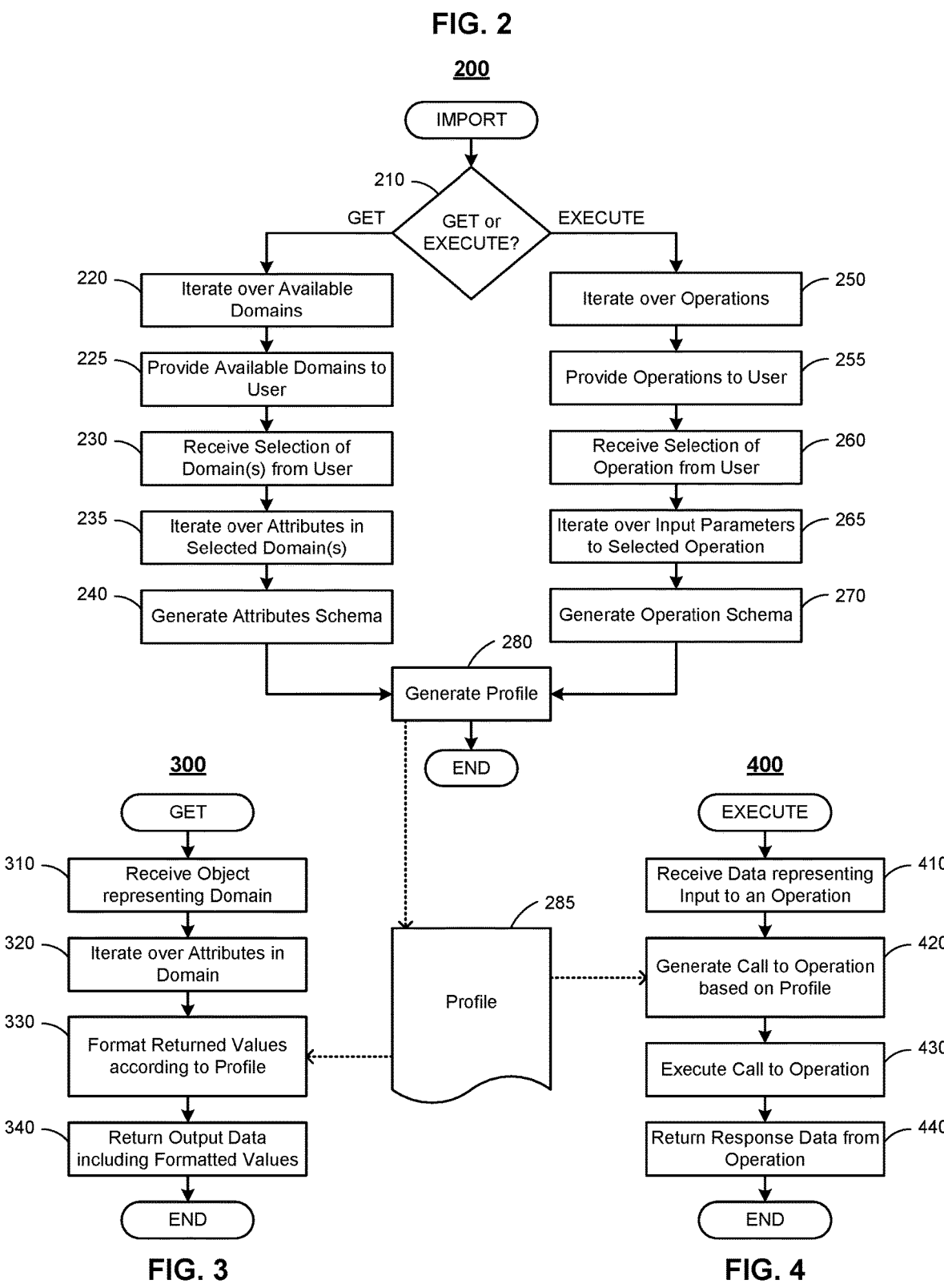

IMPORT

210

GET or EXECUTE?

GET

220 — Iterate over Available Domains

225 — Provide Available Domains to User

230 — Receive Selection of Domain(s) from User

235 — Iterate over Attributes in Selected Domain(s)

240 — Generate Attributes Schema

EXECUTE

250 — Iterate over Operations

255 — Provide Operations to User

260 — Receive Selection of Operation from User

265 — Iterate over Input Parameters to Selected Operation

270 — Generate Operation Schema

280

Generate Profile

END

300

GET

310 — Receive Object representing Domain

320 — Iterate over Attributes in Domain

330 — Format Returned Values according to Profile

340 — Return Output Data including Formatted Values

END

Profile

400

EXECUTE

410 — Receive Data representing Input to an Operation

420 — Generate Call to Operation based on Profile

430 — Execute Call to Operation

440 — Return Response Data from Operation

END

AUTOMATED GENERATION OF JAVA MANAGEMENT EXTENSIONS (JMX) CONNECTOR WITHIN INTEGRATION PLATFORM

BACKGROUND

Field of the Invention

The embodiments described herein are generally directed to integration, and, more particularly, to the automated generation of a Java Management eXtensions (JMX) connector within an integration platform.

Description of the Related Art

Integration platform as a service (iPaaS) enables the integration of applications and data. The iPaaS platform provided by Boomi® of Chesterbrook, Pennsylvania, enables a user to construct integration processes on a virtual canvas from pre-built steps, represented by "shapes," which each has a set of configuration properties. Each step dictates how an integration process retrieves data, transforms or otherwise manipulates data, routes data, sends data, and/or the like. These steps can be connected together in endless combinations to build anywhere from simple to very complex integration processes.

Recently, there has been a major push to simplify business processes. In particular, it is advantageous when workers can perform daily tasks without requiring special skills or training. This simplifies onboarding and empowers workers to be as efficient and productive as possible.

However, the technical knowledge required to construct integration processes is a barrier to simplifying (e.g., automating) the management of integration platforms. When constructing an integration process, novice users often have to go through multiple iterations of trial and error before achieving a successful implementation. In many cases, the user will have to pore through documentation and/or consult with subject-matter experts or integration experts, in order to design and develop an effective integration process. There is a large learning curve for such users.

While the construction of integration processes has been significantly simplified by companies, such as Boomi®, one area that still requires specific technical expertise is the use of Java Management eXtensions (JMX). JMX is a set of tools for managing and monitoring resources, such as software applications, system objects, devices, service-oriented networks, and/or the like. At a probe layer, objects, referred to as managed beans (MBcans), act as probes. Each probe monitors a resource by collecting statistics related to performance, usage, or problems of the resource, getting and setting configurations or properties of the resource, notifying events (e.g., faults or state changes), and the like. At a higher, agent layer, a server, referred to as the MBeanServer or JMX server, acts as an intermediary between the probes and the applications that manage and monitor the resources. At a remote-management layer, applications access the JMX server, via an application programming interface (API), to manage and monitor the resources.

An integration process is an example of a remote-management application that could be used to access the JMX server to manage resources being monitored at the probe layer. However, the configuration of a JMX connector to interface with the JMX server remains a painstaking process that must be performed by developers with JMX expertise.

Currently, there is no means to manually generate a JMX connector without JMX expertise-let alone, automatically generate a JMX connector.

SUMMARY

Accordingly, systems, methods, and non-transitory computer-readable media are disclosed for the automated generation of a Java Management extensions (JMX) connector within an integration platform.

In an embodiment, a method comprises using at least one hardware processor to: receive connection information for a Java Management extensions (JMX) server; determine whether to configure a JMX connector for a GET command or an EXECUTE command; when determining to configure the JMX connector for the GET command, query the JMX server for descriptors of one or more domains of attributes available through the JMX server, provide a representation of each of the one or more domains within a graphical user interface, receive a selection of at least one of the one or more domains via the graphical user interface, iterate over the descriptors of all attributes within the selected at least one domain to generate an attributes schema defining all attributes within the selected at least one domain, and generate a profile to comprise the attributes schema; when determining to configure the JMX connector for the EXECUTE command, query the JMX server for descriptors of one or more operations available through the JMX server, provide a representation of each of the one or more operations within the graphical user interface, receive a selection of one of the one or more operations via the graphical user interface, iterate over input parameters within the descriptor of the selected operation to generate an operation schema defining one or more input parameters of the selected operation, and generate the profile to comprise the operation schema; and incorporate the profile into the JMX connector.

In an embodiment, a method comprises using at least one hardware processor to: receive connection information for a Java Management eXtensions (JMX) server; query the JMX server for descriptors of one or more domains of attributes available through the JMX server; provide a representation of each of the one or more domains within a graphical user interface; receive a selection of at least one of the one or more domains via the graphical user interface; iterate over the descriptors of all attributes within the selected at least one domain to generate an attributes schema defining all attributes within the selected at least one domain; generate a first profile comprising the attributes schema; incorporate the first profile into a first JMX connector; and incorporate the first JMX connector into a first integration process within an integration platform. The attributes schema may define a data type of all attributes within the selected at least one domain. The method may further comprise using the at least one hardware processor to incorporate the first JMX connector into a second integration process within the integration platform, wherein the second integration process is different from the first integration process. The method may further comprise executing the first JMX connector within a runtime engine of the integration platform by: receiving an object representing at least one domain of attributes; generating one or more calls to the JMX server to retrieve a value of each attribute in the at least one domain; formatting the retrieved value of each attribute in the at least one domain according to the attribute schema in the profile; and outputting output data that comprises the formatted values. The first integration process may comprise a further step, wherein the output data are input to the further step, and wherein the further step transforms the output data into further data. The first integration process may comprise a further step, wherein the output data are input to the further step, and wherein the further step performs an action based on the output data. The first integration process may comprise a further step, wherein the output data are input to the further step, and wherein the further step sends the output data to a third-party system. The method may further comprise using the at least one hardware processor to: receive the connection information for the JMX server; query the JMX server for descriptors of one or more operations available through the JMX server; provide a representation of each of the one or more operations within the graphical user interface; receive a selection of one of the one or more operations via the graphical user interface; iterate over input parameters within the descriptor of the selected operation to generate an operation schema defining one or more input parameters of the selected operation; generate a second profile comprising the operation schema; and incorporate the second profile into a second JMX connector. The operation schema may define a data type of each of the one or more input parameters. The method may further comprise using the at least one hardware processor to incorporate the second JMX connector into a second integration process within the integration platform. The second integration process may comprise a step, preceding the second JMX connector, that outputs a value of each of the one or more input parameters as input to the second JMX connector. The method may further comprise using the at least one hardware processor to incorporate the second JMX connector into a third integration process within the integration platform, wherein the third integration process is different from the second integration process. The method may further comprise executing the second JMX connector within the runtime engine of the integration platform by: receiving data representing the one or more input parameters; generating a call to the operation, wherein the call comprises the one or more input parameters formatted according to the operation schema in the second profile; executing the call to the operation via the JMX server; and outputting any response data from the operation. The method may further comprise using the at least one hardware processor to incorporate the second JMX connector into the first integration process, wherein the first integration process is configured to: execute the first JMX connector to obtain a value of each of at least a subset of the attributes defined in the attributes schema; determine whether the obtained values satisfy one or more criteria; and when determining that the obtained values satisfy the one or more criteria, execute the second JMX connector to perform the selected operation.

In an embodiment, a method comprises using at least one hardware processor to: receive connection information for a Java Management extensions (JMX) server; query the JMX server for descriptors of one or more operations available through the JMX server; provide a representation of each of the one or more operations within a graphical user interface; receive a selection of one of the one or more operations via the graphical user interface; iterate over input parameters within the descriptor of the selected operation to generate an operation schema defining one or more input parameters of the selected operation; generate a profile comprising the operation schema; incorporate the profile into a JMX connector; and incorporate the JMX connector into a first integration process within an integration platform. The operation schema may define a data type of each of the one or more input parameters. The method may further comprise using the at least one hardware processor to incorporate the JMX connector into a second integration process within the integration platform, wherein the second integration process is different from the first integration process. The first integration process may comprise a step, preceding the JMX connector, that outputs a value of each of the one or more input parameters as input to the JMX connector. The method may further comprise executing the JMX connector within a runtime engine of the integration platform by: receiving data representing the one or more input parameters; generating a call to the operation, wherein the call comprises the one or more input parameters formatted according to the operation schema in the profile; executing the call to the operation via the JMX server; and outputting any response data from the operation.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 illustrates an example process for the automated generation of a Java Management extensions (JMX) connector within an integration platform, according to an embodiment;

FIG. 3 illustrates an example process for the implementation of a GET command within a JMX connector, according to an embodiment;

FIG. 4 illustrates an example process for the implementation of an EXECUTE command within a JMX connector, according to an embodiment.

DETAILED DESCRIPTION

In an embodiment, systems, methods, and non-transitory computer-readable media are disclosed for the automated generation of a Java Management extensions (JMX) connector within an integration platform. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
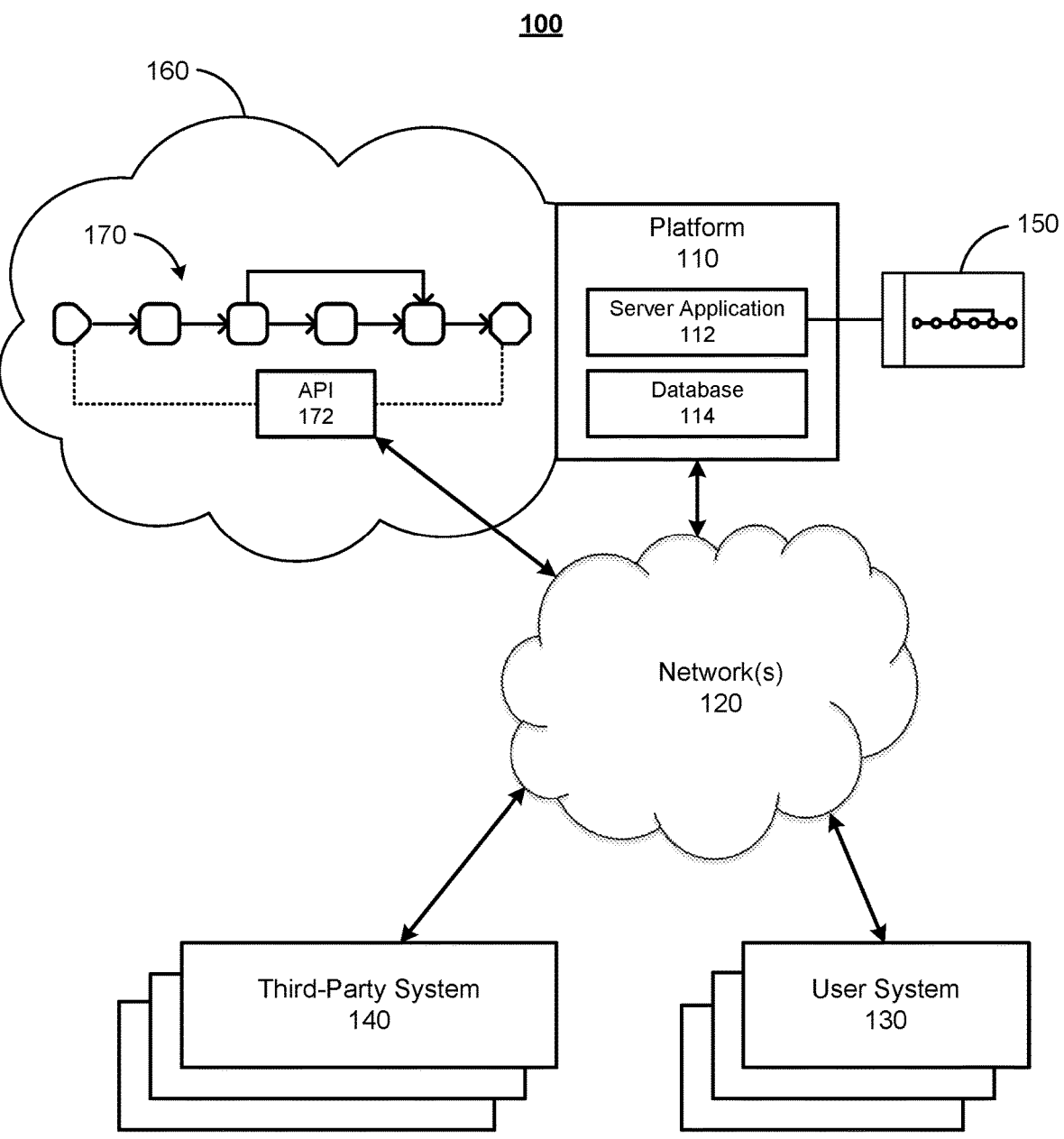
FIG. 1 illustrates an example infrastructure in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute a server application 112, which may comprise one or more software modules implementing one or more of the disclosed processes. Platform 110 may also manage one or more databases 114, which may store data used by server application 112.

Platform 110 may be communicatively connected to one or more networks 120. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems, including user system(s) 130 and/or third-party system(s) 140, through a single set of network(s) 120, it should be understood that platform 110 may be connected to the various systems via different sets of one or more networks. For example, platform 110 may be connected to a subset of systems via the Internet, but may be connected to another subset of systems via an intranet.

As mentioned above, platform 110 may be communicatively connected to one or more user systems 130 via network(s) 120. While only a few user systems 130 are illustrated, it should be understood that platform 110 may be communicatively connected to any number of user systems 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110.

Server application 112 may manage an integration environment 160. In particular, server application 112 may provide a graphical user interface 150 and backend functionality, including one or more of the processes disclosed herein, to enable users, via user systems 130, to construct, develop, modify, save, delete, test, deploy, undeploy, and/or otherwise manage integration processes 170 within integration environment 160. Of particular relevance to the present disclosure, the backend functionality of server application 112 may include a process for constructing integration processes 170, which may each potentially include one or more connectors.

Although only a single integration process 170 is illustrated, it should be understood that, in reality, integration environment 160 may comprise any number of integration processes 170. In an embodiment, integration environment

160 supports iPaaS. In this case, integration environment 160 may comprise one or a plurality of integration platforms that each comprises one or more integration processes 170. Each integration platform may be associated with an organization, which may be associated with one or more user accounts by which respective user(s) manage the organization's integration platform, including the various integration process(es) 170.

An integration process 170 may represent a transaction involving the integration of data between two or more systems, and may comprise a series of elements that specify logic and transformation requirements for the data to be integrated. Each element, which may also be referred to herein as a "step" and represented as a "shape" within graphical user interface 150, may retrieve or otherwise receive, transform or otherwise manipulate, route, and/or send data. For example, a basic integration process 170 may receive data from one or more data sources (e.g., via an application programming interface 172 of the integration process 170), manipulate the received data in a specified manner (e.g., including analyzing, normalizing, altering, updated, enhancing, and/or augmenting the received data), and send the manipulated data to one or more specified data destinations. The receiving step may be performed by a connector that interfaces with the data source, and the sending step may be performed by a connector that interfaces with the data destination. An integration process 170 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The user of a user system 130 may authenticate with platform 110 using standard authentication means, to access server application 112 in accordance with permissions or roles of the associated user account. The user may then interact with server application 112 to construct, develop, modify, save, delete, test, deploy, undeploy, and/or otherwise manage one or more integration processes 170, for example, within a larger integration platform within integration environment 160. It should be understood that multiple users, on multiple user systems 130, may manage the same integration process(es) 170 and/or different integration processes 170 in this manner, according to the permissions or roles of their associated user accounts.

Each integration process 170, when deployed, may be communicatively coupled to network(s) 120. For example, each integration process 170 may comprise an application programming interface (API) 172 that enables clients to access integration process 170 via network(s) 120. A client may push data to integration process 170 through application programming interface 172 and/or pull data from integration process 170 through application programming interface 172.

One or more third-party systems 140 may be communicatively connected to network(s) 120, such that each third-party system 140 may communicate with an integration process 170 in production environment 160 via application programming interface 172. Third-party system 140 may host and/or execute a software application that pushes data to integration process 170 and/or pulls data from integration process 170, via application programming interface 172. Additionally or alternatively, an integration process 170 may push data to a software application on third-party system 140 and/or pull data from a software application on third-party system 140, via an application programming interface of the third-party system 140. Thus, third-party system 140 may be a client or consumer of one or more integration processes 170, a data source for one or more integration processes 170, and/or the like. As examples, the software application on third-party system 140 may comprise, without limitation, enterprise resource planning (ERP) software, customer relationship management (CRM) software, accounting software, and/or the like.

2. Example Processes

FIG. 2 illustrates an example process 200 for the automated generation of a Java Management extensions (JMX) connector within an integration platform, according to an embodiment. While process 200 is illustrated with a certain arrangement and ordering of subprocesses, process 200 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 200 may be implemented by server application 112, for example, in response to an import operation. For instance, a user may be in the process of constructing an integration process 170 or a connector to be used across multiple integration processes 170, within graphical user interface 150. An example of a graphical user interface 150 that utilizes a virtual canvas for constructing integration processes 170, using shapes representing steps, is described in U.S. Pat. No. 8,533,661, issued on Sep. 10, 2013, which is hereby incorporated herein by reference as if set forth in full. During the construction process, the user may configure a JMX connector by dragging either an empty connector or prebuilt JMX connector onto the virtual canvas (e.g., from a shape palette) and selecting an input for configuring the connector. In doing so, the user may utilize one or more inputs within graphical user interface 150 to specify connection information for the relevant JMX server and/or action information for the JMX connector, and start a new profile to be used by the JMX connector, thereby triggering process 200. The connection information may comprise the Internet Protocol (IP) address of the JMX server, the port of the JMX server to be used for the connection, credentials for accessing the JMX server (e.g., username and password), if required, and/or the like. The action information may represent a specific action or API call against the JMX server. The profile may be designed to comprise a data schema that defines the structure of the data to be used by the JMX connector.

In subprocess 210, it is determined whether the profile to be generated is for a GET command or an EXECUTE command. This determination may be performed by receiving an input (e.g., binary input) from the user that indicates whether the profile to be generated is for a GET command or an EXECUTE command.

A GET command is a call to the JMX server that retrieves one or more attributes available through the API of the JMX server. These attributes may correspond to or be derived from data collected from one or more probes (e.g., MBeans) in the probe layer of JMX. It should be understood that an attribute is an attribute of one or more resources being monitored by the probe layer. An attribute may comprise a value of a parameter (e.g., statistic) related to the performance of a resource, a parameter related to the usage of a resource, a parameter related to a problem with a resource, a property of a resource, an event (e.g., fault or state change) related to a resource, and/or the like.

An EXECUTE command is a call to the JMX server that executes an operation available through the API of the JMX server. An operation may comprise setting an attribute or property of a resource, configuring a probe within the probe layer, instantiating a new probe within the probe layer, restarting the JMX server or a probe within the probe layer, and/or the like. An operation will accept zero, one, or a plurality of input parameters, and may potentially return response data.

Subprocess 210 may be an explicit determination that is based on a dedicated user operation, or may be an implicit determination that is based on the user operation that triggered process 200. When determining that the profile of the JMX connector is to be generated is for a GET command (i.e., "GET" in subprocess 210), process 200 proceeds to subprocess 220. Otherwise, when determining that the profile of the JMX connector is to be generated is for an EXECUTE command (i.e., "EXECUTE" in subprocess 210), process 200 proceeds to subprocess 250.

In subprocess 220, process 200 may iterate over all domains of attributes, available through the JMX server, to determine all of the available domains of attributes. For example, the JMX server may be queried to obtain a descriptor of each available domain of attributes. This query may be implemented using one or more JMX libraries. In particular, process 200 may connect to the JMX server using the connection information, and call a class method, available in the API of the JMX server, to derive descriptors of all domains of attributes available via GET methods in the API of the JMX sever. The domains of these attributes may be arranged in a hierarchical tree, with a leaf node of the tree representing a single attribute available from a single probe representing a single resource. Each descriptor may comprise metadata, which are associated with a respective domain by the JMX server.

In subprocess 225, a representation of each of the available domains of attributes, determined in subprocess 220, may be provided to the user within graphical user interface 150. For example, a hierarchical list of the available domains may be displayed in graphical user interface 150 with toggle inputs (e.g., checkboxes, sliders, radio buttons, etc.) for selecting or deselecting each domain and/or each attribute within each domain. Selection of a domain with subdomains and/or comprising a plurality of attributes may automatically result in selection of all of the subdomains and attributes under the domain.

In subprocess 230, a selection of one or more of the available domains, provided to the user in subprocess 225, may be received from the user via graphical user interface 150. For example, the user may utilize the toggle inputs within graphical user interface 150 to select at least a subset of the available domains, and then select an input, within graphical user interface 150, for submitting the selected domain(s) for further processing. In other words, a selection of at least one domain, comprising at least one attribute, may be received via graphical user interface 150.

In subprocess 235, process 200 may iterate over all attributes within the selected domain(s), available through the API of the JMX server, to determine all of the attributes to be retrieved by the connector being configured. For example, the JMX server may be queried or the descriptors, returned by the query in subprocess 220, may be reused to, for each of the selected domain(s), determine each attribute in the domain.

In subprocess 240, an attributes schema may be generated from the set of attributes determined in subprocess 235, and then process 200 may end. The attributes schema is a data schema that defines all attributes determined in subprocess 235. For example, the attributes schema may define the name of all attributes determined in subprocess 235, the data type of all attributes determined in subprocess 235, the organization (e.g., hierarchy) of all attributes determined in subprocess 235, and/or the like, as determined from the descriptors. The attributes schema may be represented in a mark-up language, such as extensible Markup Language (XML), JavaScript Object Notation (JSON), or YAML Ain't Markup Language (YAML), or other Data Interchange Format. Subprocess 240 may comprise parsing a descriptor of each attribute, to be defined in the attributes schema, in order to determine the data type of the attribute (which may be quite complex), and map the determined data type to a data type that is representable in the mark-up language (i.e., a markup-language-friendly data type, which may be less complex than the data type in JMX).

In subprocess 250, process 200 may iterate over all operations, available through the JMX server, to determine all available operations. For example, the JMX server may be queried to obtain a descriptor of each available operation. This query may be implemented using one or more JMX libraries. In particular, process 200 may connect to the JMX server using the connection information, and call a class method, available in the API of the JMX server, to derive descriptors of all operations available via EXECUTE methods in the API of the JMX server. It should be understood that an operation is a callable method within the API of the JMX server. An operation may have zero, one, or any plurality of input parameters, as defined by the API of the JMX server. A single operation may be overloaded, such that it is capable of receiving two or more different sets of input parameters. Each descriptor may comprise metadata, which are associated with a respective operation by the JMX server. These metadata may specify the input parameters, if any, and the response data, if any, of the respective operation.

In subprocess 255, a representation of each of the available operations, determined in subprocess 250, may be provided to the user within graphical user interface 150. For example, a list of the available operations may be displayed in graphical user interface 150 with one or more inputs for selecting one of the available operations in the list. For example, the representation of each available operation in the list may be selectable (e.g., via hyperlink) or associated with a separate input (e.g., virtual button) that is selectable. For overloaded operations, the list may contain an entry and/or input for each possible set of input parameters, such that a desired set of input parameters can be selected for the overloaded operation.

In subprocess 260, a selection of one of the available operations, provided to the user in subprocess 255, may be received from the user via graphical user interface 150. For example, the user may select the input associated with an available operation, within graphical user interface 150, to select that operation.

In subprocess 265, process 200 may iterate over all input parameters for the selected operation, to determine all of the input parameters, if any, required by the selected operation. For example, the JMX server may be queried or the descriptors, returned by the query in subprocess 250, may be reused to determine the input parameter(s), if any, for the selected operation.

In subprocess 270, an operation schema may be generated from the input parameter(s), if any, required by the selected operation, and then process 200 may end. The operation schema may define the selected operation. For example, the operation schema may define the name of the selected operation, the name of each input parameter required by the selected operation (if any), the data type of each input parameter required by the selected operation (if any), the response data returned by the selected operation (if any), and/or the like. The operation schema may be represented in a mark-up language, such as XML, JSON, YAML, or the like. Subprocess 270 may comprise parsing a descriptor of the selected operation, in order to determine the data type of each input parameter and/or the response data (which may be quite complex), and map the determined data type to a data type that is representable in the mark-up language (i.e., a markup-language-friendly data type, which may be less complex than the data type in JMX).

In subprocess 280, a profile 285 may be generated from the attributes schema, generated in subprocess 240, or the operation schema, generated in subprocess 270, depending on whether the profile is for a GET command or an EXECUTE command, as determined in subprocess 210. The profile, which represents the respective command, may comprise or consist of the respective schema. In an embodiment, the profile may comprise the respective schema and additional information related to the respective command and/or the JMX server (e.g., connection information). Profile 285 may be stored as an object (e.g., in database 114) in association with the JMX connector. Then, process 200 may end.

Once profile 285 has been generated, profile 285 may be incorporated into the JMX connector under configuration. This JMX connector may be incorporated into one or more integration processes 170 within an integration platform. A single JMX connector may be incorporated into each of a plurality of integration processes 170. For example, the JMX connector may be incorporated into both a first integration process 170 and a second integration process 170, which is different from the first integration process 170, within the integration platform.

The user may utilize one or more inputs within graphical user interface 150 to deploy an integration process 170, incorporating the JMX connector, within integration environment 160. After deployment, integration process 170, including the incorporated JMX connector, may be executed to perform the integration of JMX data. It should be understood that, during the execution of the JMX connector, integration process 170 will interface with the JMX server to either retrieve attribute(s) (e.g., in the case that the JMX connector represents a GET command) or perform an operation (e.g., in the case that the JMX connector represents an EXECUTE command).

FIG. 3 illustrates an example process 300 for the implementation of a GET command within a JMX connector, according to an embodiment. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 300 may be implemented by server application 112, for example, in response to the execution of a JMX connector for a GET command, during the execution of integration process 170 within integration environment 160. It should be understood that, in this case, profile 285 will comprise the attributes schema, generated in subprocess 240. Integration process 170 may be triggered by any configured event, such as the expiration of a fixed time interval, the availability of new data from a third-party system 140, a request for data by a third-party system 140, and/or the like. Integration process 170, including the JMX connector, may be executed within a runtime engine of the respective integration platform.

In subprocess 310, an object, representing one or more domains of attributes, may be received. In particular, the object may specify one or more domains of attributes within the attributes schema of profile 285. The reception of an object that specifies a domain of attributes that is not included within the attributes schema of profile 285 may trigger an error.

In subprocess 320, process 300 may iterate over all attributes in the domain(s) of attributes represented in the object that was received in subprocess 310. In particular, process 300 may call a GET method within the API of the JMX server for each attribute in the specified domain(s) of attributes. It should be understood that, in response to each call of the GET method, the JMX server will return the value of the respective attribute.

In subprocess 330, the data, returned by the calls in subprocess 320 and comprising the value of each attribute within the specified domain(s), may be formatted according to the attributes schema in profile 285. This formatting may comprise the name of each attribute, the data type to use for each value of each attribute, the organization of the attributes, relative to each other (e.g., in a hierarchy), and/or the like.

In subprocess 340, output data, comprising the formatted value(s) of the attribute(s) from subprocess 330, may be returned as the output of the execution of the JMX connector, and then process 300 may end. The output data may be passed as an input to a further step within integration process 170. For example, this further step may transform or otherwise manipulate the output data into further data, map the output data to another data schema, perform an action based on the output data, branch based on the output data, send the output data to a third-party system 140 or other destination, and/or the like.

FIG. 4 illustrates an example process 400 for the implementation of an EXECUTE command within a JMX connector, according to an embodiment. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 400 may be implemented by server application 112, for example, in response to the execution of a JMX connector for an EXECUTE command, during the execution of integration process 170 within integration environment 160. It should be understood that, in this case, profile 285 will comprise the operation schema, generated in subprocess 270. Integration process 170 may be triggered by any configured event, such as the expiration of a fixed time interval, the availability of new data from a third-party system 140, a request for data by a third-party system 140, and/or the like. Integration process 170, including the JMX connector, may be executed within a runtime engine of the respective integration platform.

In subprocess 410, an object, representing the input to an operation, may be received. In particular, the object may specify the value of each input parameter required by the operation. The reception of an object that is missing values, for one or more of the input parameters specified in the operation schema of profile 285, may trigger an error. This object may be generated by a preceding step in the overarching integration process 170. For example, integration process 170 may comprise a step, preceding the JMX connector being executed, that outputs the object, comprising the value of each input parameter, to be used as input to the JMX connector.

In subprocess 420, a call to the operation may be generated based on profile 285, including the operation schema of profile 285. In particular, the call may be generated to specify the operation to be performed and the value of each input parameter required by the operation. The values of the input parameters may be formatted according to the operation schema of profile 285. This formatting may comprise the order of the input parameters, the data type to use for each input parameter, and/or the like. Subprocess 420 may iterate over each input parameter in the object, received in subprocess 410, to format and add the value of each input parameter to a parameter list of the call. It should be understood that, if the operation does not require any input parameters, the object may comprise no input parameters, such that the generated call will also comprise no input parameters.

In subprocess 430, the call to the operation, generated in subprocess 420, may be executed. In particular, process 300 may call an EXECUTE method within the API of the JMX server for the operation, including the values of all required input parameters, formatted into the respective data types specified in the operation schema. In response to the call of the EXECUTE method, the JMX server may return response data. The response data may comprise a binary or enumeration value representing the outcome of the operation (e.g., succeeded or failed), the value(s) of one or more output parameters, and/or the like.

In subprocess 440, the response data, returned by the JMX server, may be returned as the output of the execution of the JMX connector, and then process 400 may end. The response data may be formatted according to an internal data schema. The response data, output by the JMX connector, may be passed as an input to a further step within integration process 170. For example, this further step may transform or otherwise manipulate the response data into further data, map the response data to another data schema, perform an action based on the response data, branch based on response data, send the response data to a third-party system 140 or other destination, and/or the like.

3. Example Application

Disclosed embodiments enable a developer of an integration platform (e.g., within an iPaaS platform) to easily configure integration process(es) 170 to access attributes of resources being monitored by a probe layer of a JMX implementation and/or perform an operation available through the JMX implementation. In particular, the developer may easily configure a JMX connector in an automated manner via process 200, which iterates over the descriptors of attributes or operations that are exposed by the API of a JMX server, provides these attributes or operations as selectable options to the user within an easy-to-use graphical user interface 150, and then transforms the descriptors for the selected attributes or operation into an attributes schema or operation schema, respectively. The data schema, whether an attributes schema or operation schema, may utilize a standard, non-proprietary Data Interchange Format (DIF), such as XML, JSON, YAML, or other mark-up language. The JMX connector is configured to interface with the JMX server to either pull attributes that are exposed by the API of the JMX server or push input parameters to an operation that is exposed by the API of the JMX server.

To configure a JMX connector, the developer may only need to perform three user operations within graphical user interface 150. In a first user operation, the developer may select an input for creating a new connector. In a second user operation, the developer may select one or more attributes (e.g., in subprocess 230) or an operation (e.g., in subprocess 260). In a third user operation, the developer may confirm completion of the JMX connector. These three user operations may be performed through a wizard, within graphical user interface 150, that walks the developer through each user operation. Notably, the developer does not have manually define any data schema or other configuration file. Rather, the data schema (i.e., attributes schema or operation schema) is created automatically by process 200, thereby removing the onus of understanding JMX, coding, and the like, from the developer.

Once configured, a JMX connector may be incorporated into any number of integration processes 170 within the integration platform. In particular, the JMX connector may be stored (e.g., by server application 112 in database 114) as a discrete object that can be incorporated into any integration process 170. For example, the JMX connector may be available as a shape, on a virtual canvas of graphical user interface 150, that can be dragged and dropped into an appropriate position within any integration process 170 being constructed on the virtual canvas. This enables the JMX connection, represented by the JMX connector, to be used and reused in a simple, repeatable, and extensible manner, in any one or more integration processes 170. Thus, a developer may construct one or more integration processes 170 around each JMX connector.

The JMX connector may be executed as a step within an integration process 170 within the runtime engine of an integration environment 160. As an example, the runtime engine may be a Boomi Atom™, which is coded in Java, so as to run in a Java Virtual Machine (JVM). However, it should be understood that the integration process 170 may be executed in other runtime engines, potentially coded in other programming languages.

It should be understood that the JMX connector, when executed within an integration process 170, may output data, representing either one or more attributes for a GET command or response data from an operation for an EXECUTE command. This output data may be analyzed, evaluated, transformed, routed, used to trigger a corrective action, and/or the like, by one or more further steps within integration process 170, in the same manner as any other data being integrated by integration process 170. In other words, the JMX connector enables JMX data to be integrated within an integration platform in the same manner as conventional integration data.

As one exemplary usage, the output of the JMX connector may comprise the value of each of one or more attributes or the response data from an operation, and be passed to one or more further steps in integration process 170. These further step(s) may determine whether or not the value(s) satisfy one or more criteria, and perform one or more actions (e.g., corrective action) when determining that the value(s) satisfy the one or more criteria. These action(s) may comprise running a system command on platform 110, executing another JMX connector that performs an operation available through the API of the JMX server (e.g., to perform a corrective action based on the value(s) of one or more attributes), issuing a customized alert to one or more recipients (e.g., via a dashboard of server application 112, an email message, a text message, a voice message, etc.), executing a script on the integration platform or platform 110, sending data (e.g., the output of the JMX connector) to one or more third-party systems 140 in a standard Data Interchange Format, and/or the like.

As mentioned above, the output of the JMX connector may be sent to a third-party system 140 in a standard Data Interchange Format. This enables the third-party system 140 to easily ingest the output of the JMX connector. Thus, a developer can easily construct an integration process 170 to transform JMX data (e.g., attribute(s) or the response data from an operation) into a standard format for use by third-party systems 140. As an example, a developer may construct an integration process 170 that pulls attributes from the probe layer of JMX (e.g., collected via Mbeans) via a JMX connector, and directly transform those attributes into a format that is capable of being ingested by multitudes of third-party systems 140 via an attributes schema of profile 285. Using process 200 to configure the JMX connector, the developer does not need to possess significant JMX expertise.

Similarly, a developer may construct an integration process 170 that collects data from multitudes of third-party systems 140 (e.g., via another connector), transforms the collected data into input parameters, via an operation schema of profile 285, for an operation through the JMX server, and executes the operation through the JMX server via a JMX connector. Again, using process 200 to configure the JMX connector, the developer does not need to possess significant JMX expertise. If applicable, response data from the operation may be transformed into a standard format, using a data schema, and sent to one or more third-party systems 140 and/or otherwise processed (e.g., by one or more further steps in the same or different integration process 170).

Notably, disclosed embodiments enable a user to leverage all of the tools and other benefits of the integration platform, on JMX data, to monitor the resources of an organization. The user has complete control over the JMX data. For example, the attributes of resources may be monitored (e.g., via a first JMX connector implementing a GET command), interpreted, and acted up (e.g., via a second JMX connector implementing an EXECUTE command) within one or more integration processes 170, wholly within the runtime engine of an integration platform, such that the JMX data never leave the runtime engine. This enhances security, since the JMX data always remains within the boundaries of the runtime engine.

As an example, in an embodiment, an integration process 170 may be constructed with both a first JMX connector that retrieves one or more attributes (i.e., corresponding to a GET command) and a second JMX connector that performs an operation (i.e., corresponding to an EXECUTE command)

based on the retrieved attributes. For example, the first JMX connector may be executed to obtain a value of each of at least a subset of the attributes defined in the attributes schema in the profile 285 of the first JMX connector. Then, integration process 170 may determine (e.g., via one or more intermediary steps) whether the obtained attribute values satisfy one or more criteria, which may represent a trigger. When determining that the obtained attribute values satisfy the one or more criteria, execution of the second JMX connector may be triggered, to perform the operation defined in the operation schema in the profile 285 of the second JMX connector. This may be performed in real time as the attributes are collected by the probe layer. The term "real time" should be understood to refer to both simultaneous events and events that are temporally separated by ordinary latencies in processing, communications, memory access, and/or the like. In any case, such an integration process 170 automatically monitors the attribute(s) of one or more resources and automatically acts on those attribute(s), without JMX data ever leaving the boundaries of the runtime engine. For instance, such an integration process 170 could determine from the monitored attribute(s), retrieved by the first JMX connector, that central processing unit (CPU) usage by the runtime engine of an integration platform satisfies one or more criteria (e.g., is higher than a predefined threshold), and, in response to that determination, execute the second JMX connector to perform a remedial action at the JMX server.

4. Example Processing System

Figure 5:
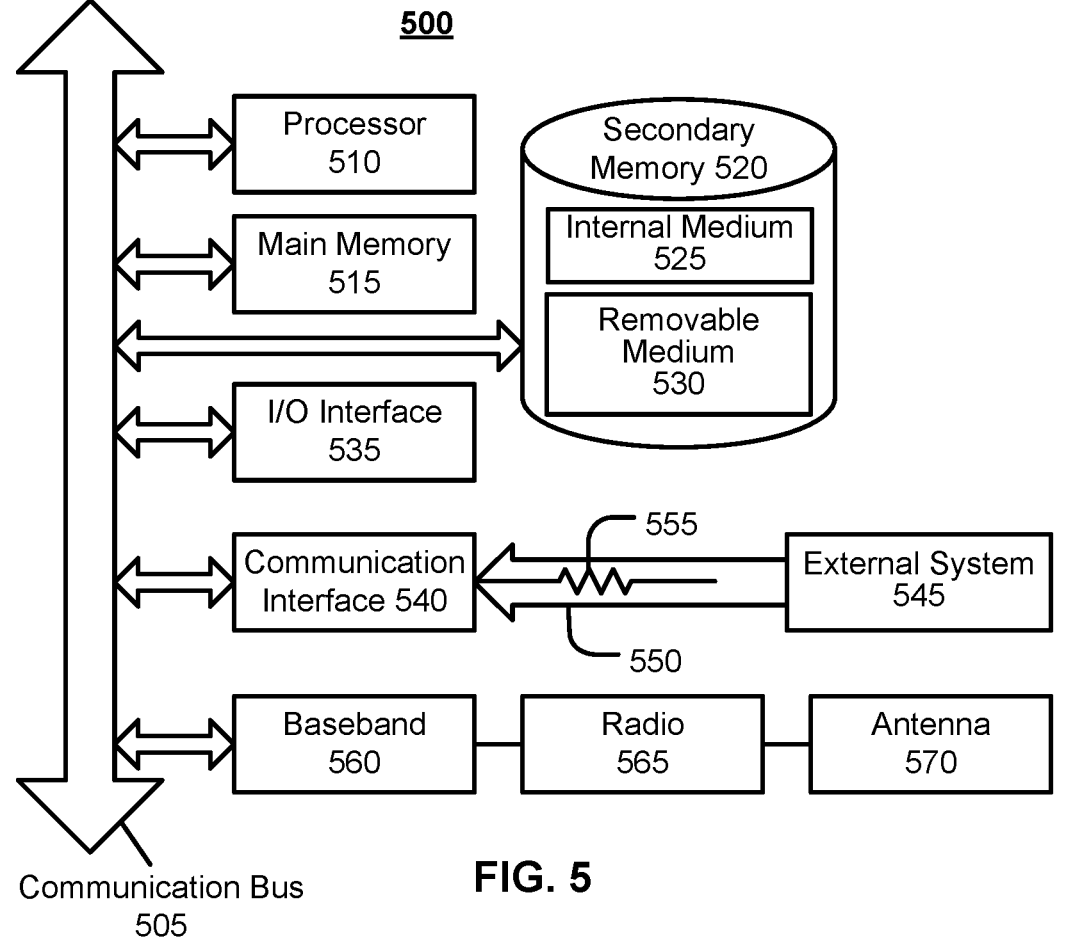
FIG. 5 illustrates an example processing system, by which one or more of the processes described herein may be executed, according to an embodiment.

FIG. 5 illustrates an example processing system, by which one or more of the processes described herein may be executed, according to an embodiment. For example, system 500 may be used to store and/or execute software that implements processes 200, 300, and/or 400, and/or may represent components of platform 110, user system(s) 130, third-party system(s) 140, and/or other processing devices described herein. System 500 can be any processor-enabled device (e.g., server, personal computer, etc.) that is capable of wired or wireless data communication. Other processing systems and/or architectures may also be used, as will be clear to those skilled in the art.

System 500 may comprise one or more processors 510. Processor(s) 510 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 510. Examples of processors which may be used with system 500 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 510 may be connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 500 may comprise main memory 515. Main memory 515 provides storage of instructions and data for programs executing on processor 510, such as any of the software discussed herein. It should be understood that programs stored in the memory and executed by processor 510 may be written and/or compiled according to any suitable language, including without limitation C/C++, Java, JavaScript, Perl, Python, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 500 may comprise secondary memory 520. Secondary memory 520 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 500. The computer software stored on secondary memory 520 is read into main memory 515 for execution by processor 510. Secondary memory 520 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 520 may include an internal medium 525 and/or a removable medium 530. Internal medium 525 and removable medium 530 are read from and/or written to in any well-known manner. Internal medium 525 may comprise one or more hard disk drives, solid state drives, and/or the like. Removable storage medium 530 may be, for example, a magnetic tape drive, a compact disc (CD) drive, a digital versatile disc (DVD) drive, other optical drive, a flash memory drive, and/or the like.

System 500 may comprise an input/output (I/O) interface 535. I/O interface 535 provides an interface between one or more components of system 500 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 500 may comprise a communication interface 540. Communication interface 540 allows software to be transferred between system 500 and external devices, networks, or other information sources. For example, computer-executable code and/or data may be transferred to system 500 from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network (e.g., network(s) 120) or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 540 is generally in the form of electrical communication signals 555. These signals 555 may be provided to communication interface 540 via a communication channel 550 between communication interface 540 and an external system 545. In an embodiment, communication channel 550 may be a wired or wireless network (e.g., network(s) 120), or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 515 and/or secondary memory 520. Computer-executable code can also be received from an external system 545 via communication interface 540 and stored in main memory 515 and/or secondary memory 520. Such computer-executable code, when executed, enables system 500 to perform the various functions of the disclosed embodiments as described elsewhere herein.

In an embodiment that is implemented using software, the software may be stored on a computer-readable medium and initially loaded into system 500 by way of removable medium 530, I/O interface 535, or communication interface 540. In such an embodiment, the software is loaded into system 500 in the form of electrical communication signals 555. The software, when executed by processor 510, preferably causes processor 510 to perform one or more of the processes and functions described elsewhere herein.

System 500 may optionally comprise wireless communication components that facilitate wireless communication over a voice network and/or a data network (e.g., in the case of user system 130). The wireless communication components comprise an antenna system 570, a radio system 565, and a baseband system 560. In system 500, radio frequency (RF) signals are transmitted and received over the air by antenna system 570 under the management of radio system 565.

In an embodiment, antenna system 570 may comprise one or more antennae and one or more multiplexors (not shown) that perform a switching function to provide antenna system 570 with transmit and receive signal paths. In the receive path, received RF signals can be coupled from a multiplexor to a low noise amplifier (not shown) that amplifies the received RF signal and sends the amplified signal to radio system 565.

In an alternative embodiment, radio system 565 may comprise one or more radios that are configured to communicate over various frequencies. In an embodiment, radio system 565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 565 to baseband system 560.

If the received signal contains audio information, then baseband system 560 decodes the signal and converts it to an analog signal. Then the signal is amplified and sent to a speaker. Baseband system 560 also receives analog audio signals from a microphone. These analog audio signals are converted to digital signals and encoded by baseband system 560. Baseband system 560 also encodes the digital signals for transmission and generates a baseband transmit audio signal that is routed to the modulator portion of radio system 565. The modulator mixes the baseband transmit audio signal with an RF carrier signal, generating an RF transmit signal that is routed to antenna system 570 and may pass through a power amplifier (not shown). The power amplifier amplifies the RF transmit signal and routes it to antenna system 570, where the signal is switched to the antenna port for transmission.

Baseband system 560 is communicatively coupled with processor(s) 510, which have access to memory 515 and 520. Thus, software can be received from baseband processor 560 and stored in main memory 510 or in secondary memory 520, or executed upon receipt. Such software, when executed, can enable system 500 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive connection information for a Java Management eXtensions (JMX) server;
   query the JMX server for descriptors of one or more domains of attributes available through the JMX server;
   provide a representation of each of the one or more domains within a graphical user interface;
   receive a selection of at least one of the one or more domains via the graphical user interface;
   iterate over the descriptors of all attributes within the selected at least one domain to generate an attributes schema defining all attributes within the selected at least one domain;
   generate a first profile comprising the attributes schema;
   incorporate the first profile into a first JMX connector;
   incorporate the first JMX connector into a first integration process within an integration platform;
   query the JMX server for descriptors of one or more operations available through the JMX server;
   provide a representation of each of the one or more operations within the graphical user interface;
   receive a selection of one of the one or more operations via the graphical user interface;
   iterate over input parameters within the descriptor of the selected operation to generate an operation schema defining one or more input parameters of the selected operation;
   generate a second profile comprising the operation schema;
   incorporate the second profile into a second JMX connector; and
   execute the second JMX connector within a runtime engine of the integration platform by
       receiving data representing the one or more input parameters,
       generating a call to the selected operation, wherein the call comprises the one or more input parameters formatted according to the operation schema in the second profile,
       executing the call to the selected operation via the JMX server, and
       outputting any response data from the selected operation.

2. The method of claim 1, wherein the attributes schema defines a data type of all attributes within the selected at least one domain.

3. The method of claim 1, further comprising using the at least one hardware processor to incorporate the first JMX connector into a second integration process within the integration platform, wherein the second integration process is different from the first integration process.

4. The method of claim 1, further comprising executing the first JMX connector within a runtime engine of the integration platform by:
   receiving an object representing at least one domain of attributes;
   generating one or more calls to the JMX server to retrieve a value of each attribute in the at least one domain;
   formatting the retrieved value of each attribute in the at least one domain according to the attribute schema in the profile; and
   outputting output data that comprises the formatted values.

5. The method of claim 4, wherein the first integration process comprises a further step, wherein the output data are input to the further step, and wherein the further step transforms the output data into further data.

6. The method of claim 4, wherein the first integration process comprises a further step, wherein the output data are input to the further step, and wherein the further step performs an action based on the output data.

7. The method of claim 4, wherein the first integration process comprises a further step, wherein the output data are input to the further step, and wherein the further step sends the output data to a third-party system.

8. The method of claim 1, wherein the operation schema defines a data type of each of the one or more input parameters.

9. The method of claim 1, further comprising using the at least one hardware processor to incorporate the second JMX connector into a second integration process within the integration platform.

10. The method of claim 9, wherein the second integration process comprises a step, preceding the second JMX connector, that outputs a value of each of the one or more input parameters as input to the second JMX connector.

11. The method of claim 9, further comprising using the at least one hardware processor to incorporate the second JMX connector into a third integration process within the integration platform, wherein the third integration process is different from the second integration process.

12. The method of claim 1, further comprising using the at least one hardware processor to incorporate the second JMX connector into the first integration process, wherein the first integration process is configured to:
   execute the first JMX connector to obtain a value of each of at least a subset of the attributes defined in the attributes schema;
   determine whether the obtained values satisfy one or more criteria; and
   when determining that the obtained values satisfy the one or more criteria, execute the second JMX connector to perform the selected operation.

* * * * *